(12) United States Patent
Kalan et al.

(10) Patent No.: US 7,693,585 B2
(45) Date of Patent: Apr. 6, 2010

(54) ENABLING OBJECT ORIENTED CAPABILITIES IN AUTOMATION SYSTEMS

(75) Inventors: Michael D. Kalan, Highland Heights, OH (US); John J. Baier, Mentor, OH (US); David W. Farchmin, Grafton, WI (US); Randall A. Marquardt, Waukesha, WI (US); Richard A. Morse, Hudson, OH (US); Stephen C. Briant, Moon Township, PA (US); Sujeet Chand, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1133 days.

(21) Appl. No.: 10/955,654

(22) Filed: Sep. 30, 2004

(65) Prior Publication Data

US 2006/0074498 A1    Apr. 6, 2006

(51) Int. Cl.
*G05B 11/01* (2006.01)
(52) U.S. Cl. ............... 700/19; 340/825.52; 340/870.31; 365/185.01; 433/223; 710/107
(58) Field of Classification Search .................. 700/19; 433/223; 365/185.01; 710/107; 340/825.52, 340/870.31
See application file for complete search history.

(56) References Cited

U.S. PATENT DOCUMENTS

| 5,453,933 A |   | 9/1995  | Wright et al.  |         |
|-------------|---|---------|----------------|---------|
| 5,548,756 A | * | 8/1996  | Tantry et al.  | 707/10  |
| 5,812,394 A | * | 9/1998  | Lewis et al.   | 700/17  |
| 6,161,051 A | * | 12/2000 | Hafemann et al.| 700/86  |
| 7,089,530 B1| * | 8/2006  | Dardinski et al.| 717/105|
| 2003/0004585 A1 |  | 1/2003 | Horn et al.   |         |

FOREIGN PATENT DOCUMENTS

EP          1246059          10/2002

OTHER PUBLICATIONS

Expert systems as knowledge servers. Eriksson, H.; Expert, IEEE [see also IEEE Intelligent Systems and Their Applications]. vol. 11, Issue 3, Jun. 1996 pp. 14-19.*
Australian Search Report dated Jun. 29, 2006 for Australian Patent Application Serial No. SG 200506292-2, 3 pages.
European Search Report dated Apr. 27, 2006 for European Patent Application Serial No. EP 05 02 1344, 3 pages.

* cited by examiner

*Primary Examiner*—Albert DeCady
*Assistant Examiner*—Tejal Gami
(74) *Attorney, Agent, or Firm*—Turocy & Watson LLP; R. Scott Speroff

(57) ABSTRACT

The invention relates to systems and methods that support object oriented access to information at multiple levels in a control architecture, for example. Such data access can be facilitated as a layer adjacent to or part of an MES system or as a white box cooperating to encapsulate data such as in the controller or the MES layer, for example. In addition, such object oriented data access can be built into a controller as a standard behavior of controller data types and tags of those data types. In this manner, data can be encapsulated as a data object to expose properties and/or methods related to the data utilizing a common interface with each data consumer. Thus, the data consumer can employ object oriented concepts, such as properties, methods, scope qualifiers, access qualifiers (private, protected, public enterprise), polymorphism, inheritance and the like directly with their automation system components.

25 Claims, 13 Drawing Sheets

ENABLING OBJECT ORIENTED CAPABILITIES IN AUTOMATION SYSTEMS

TECHNICAL FIELD

The subject invention relates to industrial control systems, and more particularly to systems and methods to enable object-oriented capabilities in automation systems.

BACKGROUND OF THE INVENTION

Industrial controllers are special purpose processing devices used for controlling industrial processes, machines, manufacturing equipment, and other factory automation applications. In accordance with a control program or routine, an industrial controller can measure one or more process variables or inputs representative of the status of a controlled process, and change outputs effecting control of the process. The inputs and outputs can be binary, (e.g., on or off), and/or analog assuming a continuous range of values. The control routine can be executed in a series of execution cycles with batch processing capabilities, and can comprise one or more functional units. Such a control routine can be created in a controller configuration system having tools and interfaces whereby a user can implement a control strategy using programming languages or graphical representations of control functionality. The control routine can be downloaded from the configuration system into one or more controllers for implementation of the control strategy in controlling a process or machine.

The measured inputs received from a controlled process and the outputs transmitted to the process can pass through one or more input/output (I/O) modules in a control system, which serve as an electrical interface between the controller and the controlled process, and can be located proximate or remote from the controller. The inputs and outputs can be recorded in an I/O table in processor memory. Input values can be asynchronously read from the controlled process by one or more input modules and output values can be written directly to the I/O table by a processor for subsequent communication to the process by specialized communications circuitry. An output module can interface directly with a controlled process by providing an output from an I/O table to an actuator such as a motor, drive, valve, solenoid, and the like.

During execution of the control routine, values of the inputs and outputs exchanged with the controlled process pass through the I/O table. The values of inputs in the I/O table can be asynchronously updated from the controlled process by dedicated scanning circuitry. This scanning circuitry can communicate with input and/or output modules over a bus on a backplane or network communications. The scanning circuitry can also asynchronously write values of the outputs in the I/O table to the controlled process. The output values from the I/O table can be communicated to one or more output modules for interfacing with the process. Thus, a controller can simply access the I/O table rather than needing to communicate directly with the controlled process.

In distributed control systems, separating the industrial controller into a number of control modules (each of which performs a different function) can facilitate controller hardware configuration. Particular control modules needed for the control task can then be connected together on a common backplane within a rack and/or through a network or other communications medium. The control modules can include processors, power supplies, network communication modules, and I/O modules exchanging input and output signals directly with the controlled process. Data can be exchanged between modules using a backplane communications bus, which can be serial or parallel, or via a network. In addition to performing I/O operations based solely on network communications, smart modules exist which can execute autonomous logical or other control programs or routines.

Various control modules of a distributed industrial control system can be spatially distributed along a common communication link in several racks. Certain I/O modules can thus be located proximate a portion of the control equipment and away from the remainder of the controller. Data can be communicated with these remote modules over a common communication link, or network, wherein all modules on the network communicate via a standard communications protocol.

In a typical distributed control system, one or more I/O modules are provided for interfacing with a process. The outputs derive their control or output values in the form of a message from a master or peer device over a network or a backplane. For example, an output module can receive an output value from a processor, such as a programmable logic controller (PLC), via a communications network or a backplane communications bus. The desired output value is generally sent to the output module in a message, such as an I/O message. The output module receiving such a message will provide a corresponding output (analog or digital) to the controlled process. Input modules measure a value of a process variable and report the input values to a master or peer device over a network or backplane. The input values can be used by a processor (e.g., a PLC) for performing control computations.

Data and behavior are separate in today's automation systems wherein copies of data can exist at multiple levels in a control architecture, such as the plant floor, control level and MES level. Maintaining persistence at multiple locations in the control system for a particular data source, for example, can lead to several problems. For instance, data can be changed independent of system behavior which can lead to inconsistencies between the data and behavior. In addition, data and/or behavior can be changed at one level (e.g., control level) without making corresponding changes at other levels (e.g., MES level) that can surface as incorrect automation system behavior.

Furthermore, as noted, data is typically stored in one or more controllers within a particular control system. Data can be stored in multiple formats including various bit, word and integer values which can be distributed throughout a system and thus not collected or organized, which can provide difficult and cumbersome communication with an external device. In order to communicate with the data, generic I/O reads can be employed to read data in disparate locations in order to determine the attributes and methods of such data and how such data can be employed. In this manner, data can be stored at various levels in the architecture and may not be self-describing and therefore cannot be easily utilized by disparate levels in the architecture.

Conventionally, the format and meaning of data must be predefined such that the format and value of data (e.g., bit, word, tag name, etc.) has designated meaning to the control system. For example, if a word "Joe" represents a scaling factor, such meaning behind the data has to be conveyed from the source to the subscriber, layer by layer within a control system (e.g., from a component to the MES layer) so the data can be read and understood by the data subscriber. Similarly, communication in the opposite direction encounters difficulty such that if you want to perform a procedure, you have to follow a specific protocol to make changes to data. Thus, conventional communication between the control system and the MES layer, for example, can fail if a particular data communication protocol is not followed.

FIG. 13 is provided to illustrate one particular industrial automation architecture, wherein such figure and accompanying text are provided to illustrate various deficiencies associated with conventional architectures. The current state of the art in industrial automation systems employs a hierarchical architecture with two or more layers. Prior art FIG. 13 illustrates a typical, 3-layer architecture that utilizes a control layer 1310, a Manufacturing Execution (MES) System 1320 layer and an Enterprise Resource Planning (ERP) 1330 layer. It is important to note the functions in the layered architecture. The control layer 1310 (e.g., factory floor) can contain controllers such as PLCs and drives, which are specialized for real-time control. As such, these controllers capture factory floor data and communicate this data to a higher level (e.g., MES layer 1320, ERP layer 1330, etc.). The MES layer 1320 can be comprised of one or more computing devices with structured data, software applications and transaction-oriented architecture. The ERP layer 1330 can employ one or more computing devices that typically run ERP software such as order management and customer management applications, for example. The control layer 1310 data comprises the state of sensors and actuators and does not relate these states to physical or logical entities such as a batch of product or efficiency of a machine. Such data is called unstructured, since significant custom programming is required to translate this data to a structured data type that is typically utilized at the MES layer 1320 or the ERP layer 1330. Also, due to the controllers passing unstructured data to multiple MES applications that may reside on multiple computers, it is common today to have many copies of the same data in several places. This is undesirable due to reasons such as difficulty in system recovery and discovery of a single "correct" copy of the data in the event of a failure.

Accordingly, in view of at least the above, flexible and forgiving systems and methods to communicate data and behavior within a control architecture are needed in the art of industrial automation.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

The invention provides systems and methods to create structured objects within a controller (e.g., industrial controller, programmable logic controller, smart terminal, etc.) that provide well defined interfaces for both data and services such that an external client (e.g., control system, MES layer, etc.) can request data and/or services from a controller in a known format. Thus, the external client need not have knowledge of data location and/or format (e.g., how particular bits and bytes are organized) within the controller.

In this manner, object level capabilities can be utilized within a controller wherein identifying an object and identifying properties for data can be accomplished. Similarly, identifying method for service calls for activating and requesting items can be accomplished, in accordance with an aspect of the subject invention. In this manner, the control system can publish signature information to upper level clients to mitigate the need for specific data format and organization. The control system can connect to the control services via the controller to communicate the objects and corresponding services to one or more controllers. Dynamic queries can be employed to locate such services instead of conventional methods wherein data documentation is required.

The aforementioned benefits can be accomplished via providing a packaging component that receives data from a data source, such as a programmable logic controller or other suitable floor-level device. This received data can thereafter be encapsulated in such a manner as to expose properties and methods of such received data, rendering these properties and methods as one or more data objects. Use of a data object format that is common to high-level systems utilized in an industrial automation context (e.g., Enterprise Resource Planning systems, . . . ) as well as factory floor devices (e.g., programmable logic controllers) can be employed to facilitate access to the properties and methods that are encapsulated as data object(s). Upon formatting the data as one or more data object(s), a data-consuming device within an industrial automation environment can employ an interface to access a data object that represents properties and/or methods that are desirably received.

Leveraging the trend in the rapid increase of computing power and high-speed communications within the controllers on the factory floor, the subject invention focuses on the creation of a common, object-oriented representation of automation data across the hierarchical boundaries of today's factory floor, MES, and ERP systems. As such, this object-oriented representation can be common across all levels of the industrial automation hierarchy, and allows connections between the layers to be generated with standard programming techniques. The present invention greatly reduces customized software and customized data interfaces, wherein data can be stored and accessed from a single location within a control architecture, such as the location where particular data is generated.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
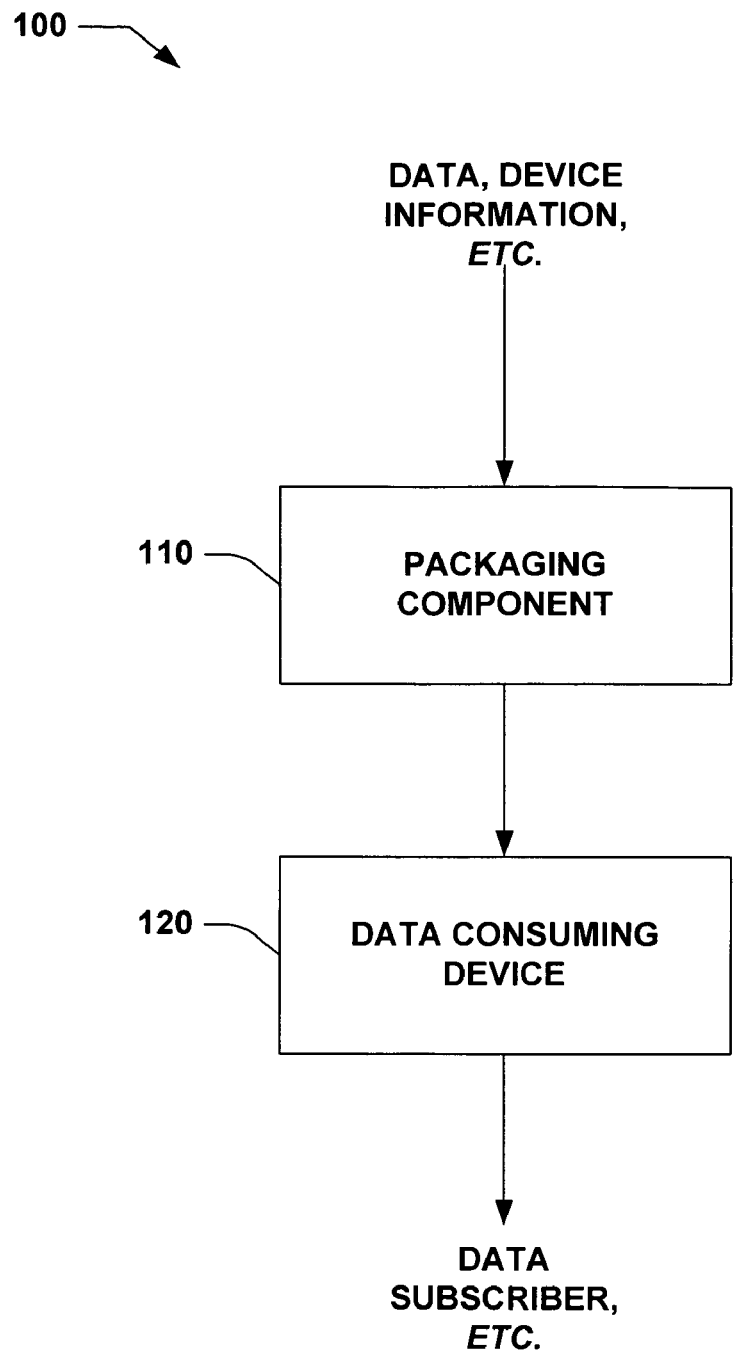
FIG. 1 illustrates an exemplary directory interface system in accordance with an aspect of the current invention.

The various aspects of the subject invention will now be described with reference to the drawings, wherein like reference numerals are used to refer to like elements throughout. The invention relates to systems and methods that support object oriented access to information at multiple levels in a control architecture, for example. Such data access can be facilitated as a layer adjacent to or part of an MES system or as a white box cooperating to encapsulate data such as in the controller or the MES layer, for example. In addition, such object oriented data access can be built into a controller as a standard behavior of controller data types and tags of those data types. In this manner, the user can employ object oriented concepts, such as properties, methods, scope/access qualifiers (private, protected, public enterprise), polymorphism, inheritance and the like directly with their automation system components. This access to data is in sharp contrast to conventional factory automation control techniques wherein data is stored in multiple locations within a hierarchical data architecture.

For example, in a hierarchical architecture, a factory floor can include controllers such as PLCs and Drives, which are specialized for real-time control. As such, these controllers can capture factory floor data and communicate this data to a higher level. The factory floor data comprises the state of sensors and actuators and does not relate these states to physical or logical entities such as a batch of product or efficiency of a machine. Such data can be unstructured, since significant custom programming may be required to translate this data to a structured data type that is typically utilized in an MES system or an Enterprise system. Also, due to the controllers passing unstructured data to multiple MES applications that may reside on multiple computers, it is common today to have many copies of substantially similar data in several places. This multiplicity of data is undesirable due to reasons such as difficulty in system recovery and discovery of the "golden copy" of the data in the event of a failure.

Referring now to FIG. 1, an exemplary system 100 comprises a packaging component 110 that interfaces with a data consuming device 120. The packaging component 110 can be employed to accept data from one or more sources and package such data in a manner that allows the data consuming device 120 to simplify systems integration, development and maintenance of an automation system, for example. Such simplification is made possible by encapsulating the data such that properties and methods of the data are accessible to substantially any suitable data subscriber.

The packaging component 110 can receive information from any number of sources to which such packaging component 110 is communicatively connected. For example, the packaging component 110 can communicate with external devices located throughout a data driven architecture to receive information from various sources related to the control architecture of the system. Such information can be sent via a specific protocol or communication standard such as Ethernet, ControlNet, DeviceNet, Profibus, CAN bus or the like. Alternatively or in addition, communication can be accomplished via a wireless protocol such as wireless Ethernet, infrared, Wi-Fi, Bluetooth, etc. In addition, the packaging component 110 can receive data through various media such as twisted pair, coaxial cable, serial cable and the like. The packaging component 110 can be a hardware interface such as a serial port, USB port, wire terminal, etc. or a hardware device such as wire, cable, port, etc. Alternatively, the packaging component 110 can be software in nature such that data is received and transmitted via software interface such as an API, for example.

The packaging component 110 can be employed to package data so that it can support object-oriented access to data with one or more levels of a particular control architecture. For example, such packaged data can be accessed by an application at the Manufacturing Execution Systems (MES) and/or a processing component at the control level, for example. Thus, only a single copy of data from a particular source need exist in a particular control architecture. Such packaged data can be stored in a memory (not shown) such that a robust means of data persistence can be maintained throughout a control architecture.

The packaging of data received by the packaging component 110 can be determined by a number of various factors. Data can include a wide range of information types including values as well as metadata employed to describe such values. For example, a data transmission from a non-contact sensor could contain a data value of 2.4 volts as well as the scaling factor of the data and the manufacturer and model number of the sensor. The scaling factor can be employed to determine a real world value of incoming data. For example, a value of 2.4 volts can represent a measurement of 17 cm utilizing a particular scaling factor.

It is to be appreciated that the subject invention can completely abstract any notion of location and/or data meaning and simply expose an appropriate subset of properties and methods to a data consumer. For instance, instead of having to designate that a word in a control scheme is a scale, the packaged data can have a property "scaling value." Similarly, if packaged data is utilized to activate the next batch in a process, there can be a method exposed to "run next batch" instead of requiring the data subscriber to know that activating such a batch requires setting a certain bit of a particular word in a control system, for example. Properties could be exposed that represent recipe values such as Ingredient Amounts, Cook Time, Cook Temperature, etc. Alternatively, these properties could be parameters of the "run batch" command. In addition, these objects, methods and properties can be published in order to reduce documentation of data within a system.

The data consuming device 120 can be substantially any device, component, application and the like that employs particular data. As noted, once data is packaged by the packaging component 110, it can be employed as a data object and utilized by the data consuming device. In this manner, the data consuming device 120 (e.g., MES application) can directly read and/or write properties and/or invoke methods of controller-based data objects, for example. By way of further example, a controller might be a client device that can directly read and/or write properties and/or invoke methods of objects exposed by an MES layer application (or another controller's) data objects. Thus, packaging data as data objects can facilitate communication and implementation of data throughout an entire control system. In addition, since only a single copy of such data exists, a control system can be more robust in that it provides consistent data (e.g., properties) and methods (e.g., behavior) within the system.

The packaging component 110 and the data consuming device 120 can be remote or local to one another and can be coupled utilizing various techniques. For instance, the data consuming device 120 can request data from the packaging component 110 based on a condition, one time or on a periodic basis and can be made utilizing any number of communication protocols such as ControlNet, DeviceNet, Profibus, Ethernet and the like. Further, various media can be employed to transmit such a request such as wired (e.g., coaxial cable, twisted pair, etc.) and/or wireless technologies (e.g., infrared, wireless Ethernet, Bluetooth and the like). As shown, the data consuming device 120 can re-transmit the data (e.g., properties and/or methods) to another disparate data consuming device, such as a controller or software application, for example.

Figure 2:
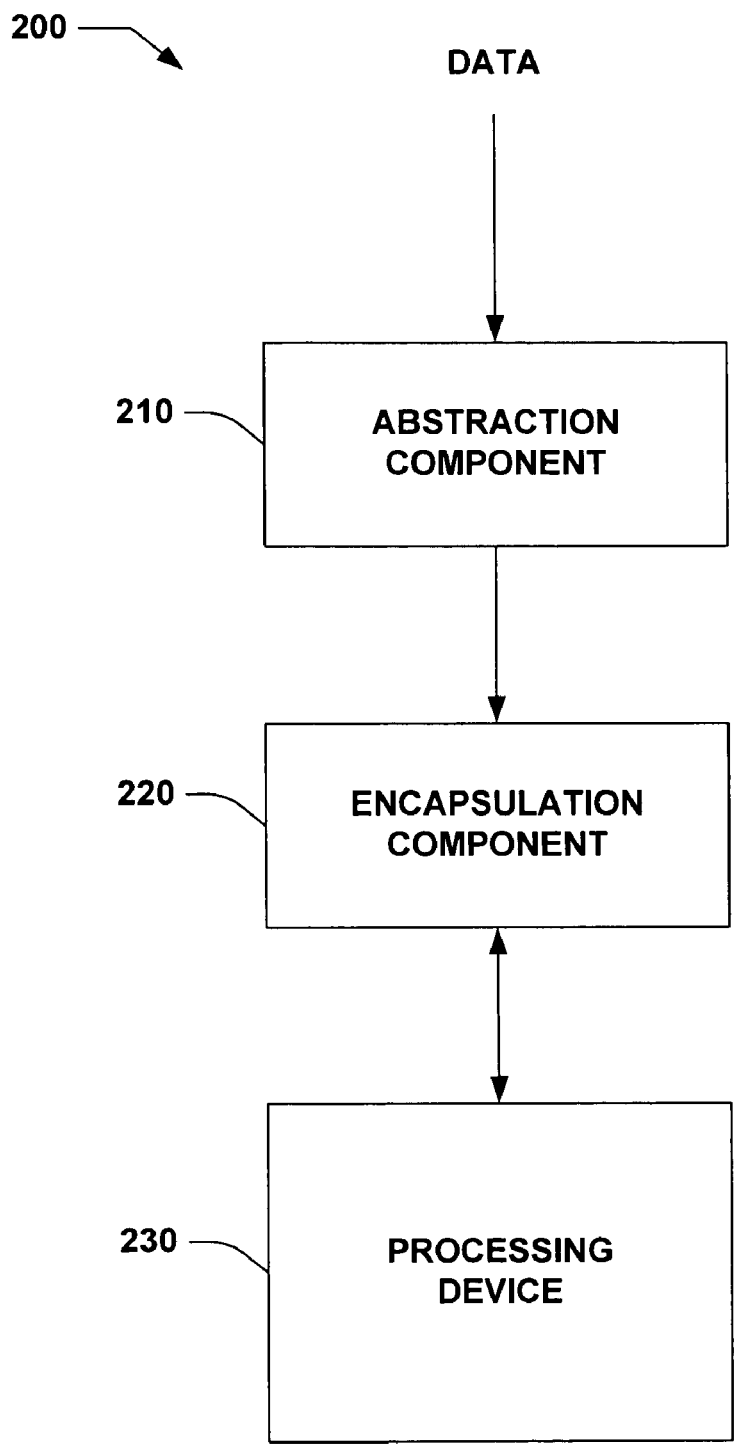
FIG. 2 illustrates an exemplary directory interface system with an artificial intelligence component in accordance with an aspect of the current invention.

FIG. 2 shows a system 200 that employs an abstraction component 210 and an encapsulation component 220 to provide a data object that can interface with a processing device 230. The abstraction component 210 can receive data from one or more sources that can be located within a particular control architecture. For instance, the data can be received from an Enterprise Resource Planning (ERP) application, MES application, controller and the like. In addition, the data can employ various formatting and include self describing information that relates to how such data can be employed, the source of the data, scale of the data and so on.

The abstraction component 210 can be utilized to determine what properties and methods are exposed to a particular data consumer. In this manner, consumer confusion can be mitigated by not allowing the consumer to view data that they are not interested in and/or should be prohibited from accessing. For example, if a data consumer wishes to access a scaling factor from a data object within a control system, the abstraction component can simply provide the scaling factor of the data and eliminate additional unneeded data such as data source, source location, source manufacturer and the like.

The encapsulation component 220 can be employed to define the manner in which a data object can interface to various data consumers. In accordance with the subject invention, access to the properties and/or methods of a data object can be dictated by the interface(s) employed to communicate with such data object. For example, the encapsulation component can define the manner in which a data object interfaces with the processing device 230. In this approach, a data object can employ disparate data to provide the same properties and/or methods to the processing device 230. The encapsulation component 220 allows a user to modify the data employed to provide such properties and/or methods to a particular data consumer, such as the processing component 230, for example.

By encapsulating the data, changes can be made to a data object that are hidden from the processing device 230 but that provide the same interface to the processing device 230 to provide a consistent and reliable means of communication. In addition, such an interface can provide comprehensive "tags" to describe various data to the data consumer. For example, instead of presenting a data point and/or word to a data consumer, tags can be employed that describe the data and automatically allow such data consumer to interface to the desired aspect of the control system. For instance, a certain data point can be identified as "scale", "temperature", "distance" and the like. In this manner, a data consumer does not have to be familiar with the location and function of data throughout a control network. Instead, such a consumer can simply query a particular control system relating to data with various properties and/or methods to receive desired data to interface.

The encapsulation component 220 can have an artificial intelligence (AI) component (not shown) that can determine the best manner in which to interface to a data consumer, such as the processing device 230. For example, the AI component can recognize the type and corresponding needs of a data consumer and subsequently provide an appropriate interface to a data object.

In one aspect of the subject invention, the interface to the data object, as well as properties and methods of such data exposed to a data consumer can be generated by machine learning wherein one or more training sets of data with examples of desired results and/or undesired results for searches can be utilized to train the system. In another aspect of the subject invention, initial conditions, based on one or more features that indicate desired results, can be utilized. Such initial conditions can be adjusted over time and in response to user actions associated with returned results in order to improve discrimination. For example, results utilized by the user can be employed to train the system to learn desired results for the associated query. In addition, knowledge of which results (e.g., properties, methods, etc.) are most often requested for a particular data item can be used to configure the appropriate interface to expose only such information that a data subscriber is interested in and/or authorized to view. For example, a result that is accessed more times by the user can be deemed more useful to the user. In this manner, if a particular data consumer requests specific properties and/or methods, such data aspects can be utilized in the future.

In addition, as utilized herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources. Various classification schemes and/or systems (e.g., support vector machines, neural networks (e.g., back-propagation, feed forward back propagation, radial bases and fuzzy logic), expert systems, Bayesian networks, and data fusion) can be employed in connection with performing automatic and/or inferred action in connection with the subject invention.

In yet another aspect of the invention, a technique can be employed to anticipate the appropriate interface to a data consumer. For example, information such as historical data representing data and attributes associated with such data that has been utilized with interfacing to various subscribers can be employed to predict a subscriber's preferred properties and/or methods of data within a network. For example, intelligent decisions based on statistics, probabilities, inferences and classifiers (e.g., explicitly and implicitly trained), including Bayesian learning, Bayesian classifiers and other statistical classifiers, such as decision tree learning methods, support vector machines, linear and non-linear regression and/or neural networks can be employed in accordance with an aspect of the subject invention. In this manner, the AI component (not shown) can be employed by the encapsulation component to provide decision making based on learned actions of a particular data consumer in relation to a particular data source.

In one approach, the processing device 230 can be substantially any component wherein one or more data points can reside. According to one aspect of the subject invention, a programmable logic controller (e.g., Allen Bradley PLC5, SLC-500, MircroLogix, etc.) can be the processing device 230. For example, the processing device 230 can be an Allen Bradley SLC-500 PLC employed to communicate with one or more data consumers utilizing disparate protocols. By way of further example, the processing device can be a software application such as a database that can request and/or utilize various data with particular properties and/or methods.

Figure 3:
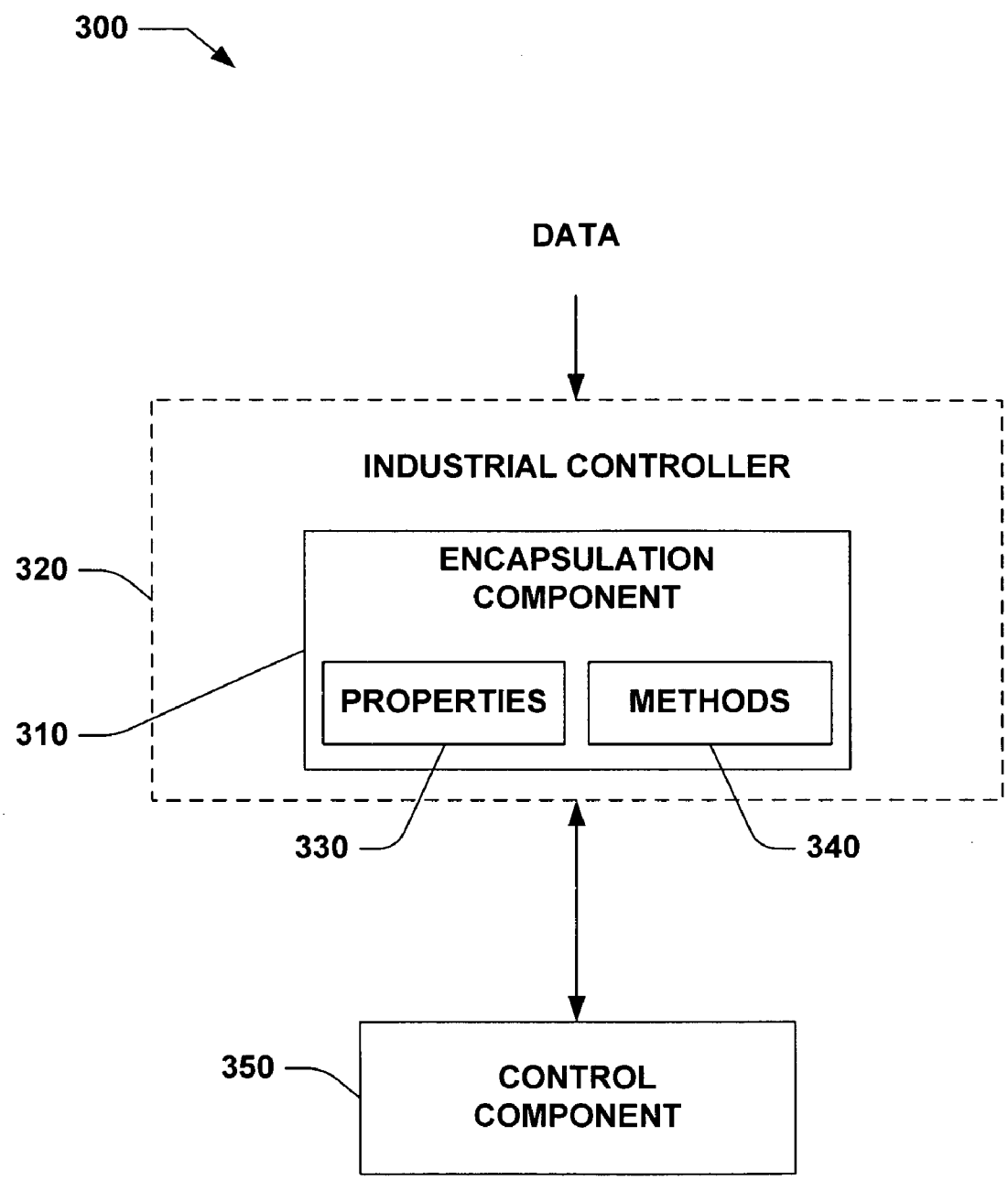
FIG. 3 illustrates an exemplary directory interface system with multiple data sources in accordance with an aspect of the current invention.

FIG. 3 illustrates a system 300 that contains an encapsulation component 310 embedded in an industrial controller 320. The encapsulation component 310 provides properties and methods of data received by the industrial controller 320. As shown, the industrial controller 320 is coupled to a control component 350. The industrial controller 320 can be virtually any processing device employed in an industrial environment. Such examples include a programmable logic controller, intelligent processor, remote terminal, data acquisition card and the like. In addition, communication with the industrial controller can be accomplished utilizing any number of media (e.g., coaxial cable, twisted pair, serial, etc.) and/or protocols such as ControlNet, DeviceNet, Ethernet, infrared and so on. In addition, the industrial controller can have one or more ports to provide data transmission to various data consumers. In this manner, the industrial controller 320 can be receive and/or transmit data in substantially any control system to which it is introduced.

As shown, the encapsulation component 310 is embedded in the industrial controller 320. However, it is to be appreciated that the encapsulation component can be located in substantially any location (e.g., remotely) with respect to the industrial controller 320. The encapsulation component 310 can be employed to encapsulate data received by the industrial controller such that the data is presented to disparate data consumers to enable object-oriented capabilities in an automaton system, for example. In this manner, a data consumer can employ object-oriented concepts with respect to the data such as properties, methods, scope and/or access qualifiers, polymorphism, inheritance, etc. For example, the term "aggregate" can be employed by more than one data consumer (not shown) that can interface to the industrial controller wherein each consumer assigns a disparate meaning to such a term. In this approach, the data from the encapsulated component can recognize the specific function required by each different data consumer.

By way of further example, a group of similar data objects (e.g., data from the same process, same control aspect, etc.) can be grouped to define the properties and methods associated with the data in such a group. In this manner, the properties and methods associated with a group of data objects can be defined a single time and utilized by a plurality of data consumers without having the redefine such properties and methods on multiple occasions. In addition, consistency of data definition and usage throughout a control system can be maintained.

Figure 4:
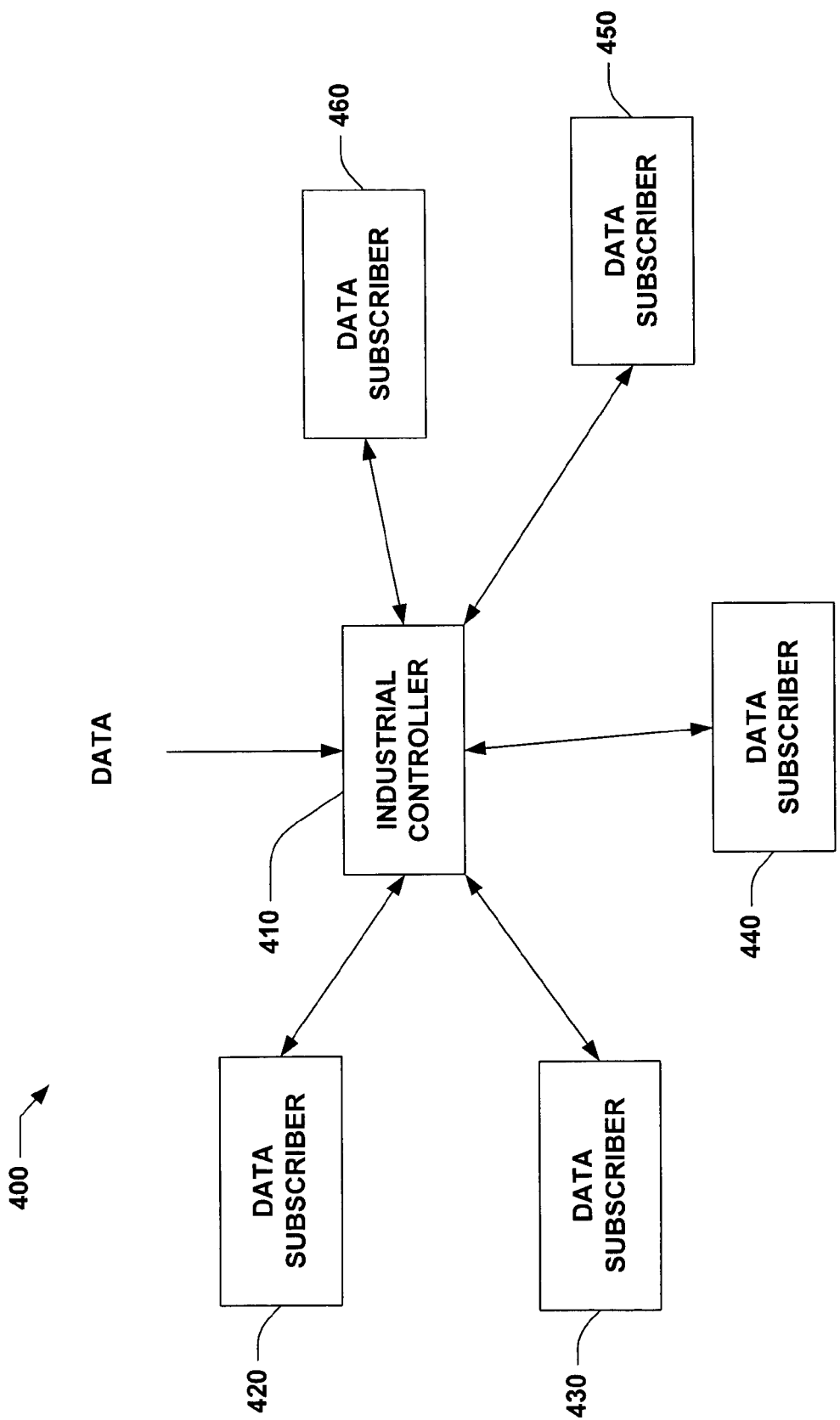
FIG. 4 illustrates an exemplary system that employs a directory interface system with a plurality of data requesters and data sources in accordance with an aspect of the current invention.

Referring now to FIG. 4, an exemplary system 400 wherein an industrial controller 410 is interfaced to a plurality of data subscribers 420-460 is illustrated. Data received by the industrial controller 410 can be stored in a memory (not shown) to be accessed at a later time. The industrial controller 410 can be substantially any controller that can reside in an industrial environment such as a component that meets specific environmental standards such as IP67, IP45 and the like. In addition, the industrial controller 410 can process and/or store data received to be retrieved and employed locally and/or remotely.

The data received and stored by the industrial controller 410 can provide a single copy of such data to the rest of the system 400. This data can be encapsulated to expose an appropriate subset of properties and methods to one or more data subscribers, for example. In this manner, only authorized subscribers that are interested in such data aspects can view the data. The encapsulated data can be self-describing as communicated throughout various interfaces within a control system. Additionally, one or more data subscribers 420-460 which may be located at various disparate locations throughout a particular control architecture can access data via the industrial controller.

The data subscribers 420-460 can be any location and/or control level within a particular architecture and/or system. For example, data subscriber 430 can represent an application in the MES layer wherein such an application can directly read and/or write properties and/or invoke methods of data within the industrial controller 410. Such data interfacing can be accomplished by employing various technologies. For instance, a standard execution engine can be embedded into the industrial controller and/or data subscriber such as NET common language runtime or Java virtual machine. In addition, controller object oriented concepts can be enabled with data from the industrial controller utilizing standard control system programming languages such as IEC-1131 languages, for example. Such languages can include relay ladder logic, structured text, function block diagram, sequential function chart, instruction list and so on.

Figure 5:
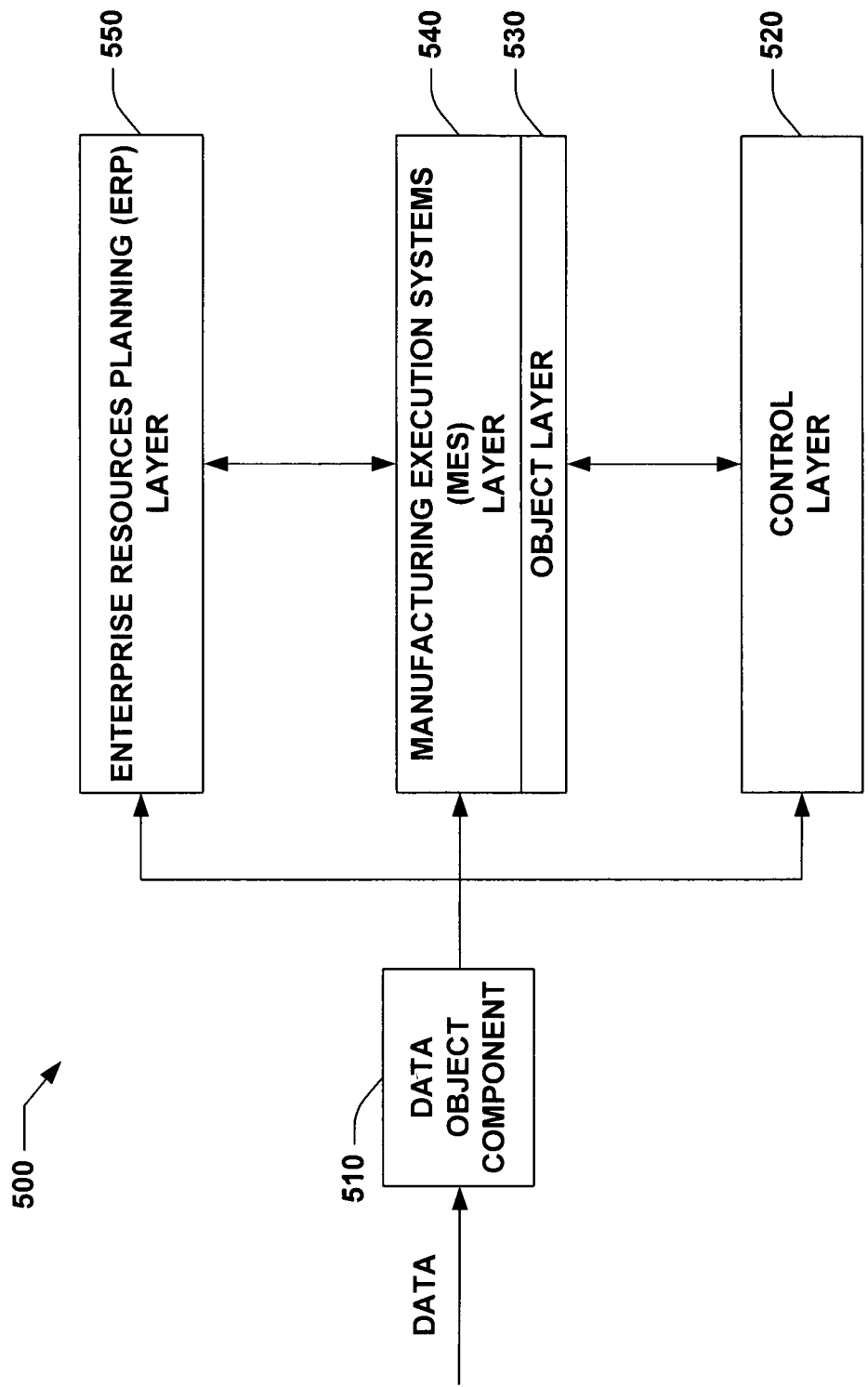
FIG. 5 illustrates a directory structure system in accordance with an aspect of the current invention.

FIG. 5 represents a control architecture 500 wherein a data object component 510 interfaces to a control layer 520, an object layer 530, an MES layer 540 and/or an ERP layer 550. The data object component 510 can receive information from one or more sources to abstract and encapsulate such information, which in turn can be output as a data object(s). This data object can interface to one or more layers (e.g., control, object, MES, ERP, etc.) of the control architecture 500 such that the data object can be easily interchanged up and down such an automation hierarchy, for example. In this approach, object oriented access to information can be supported at multiple levels of the control architecture 500.

It is to be appreciated that data employed with the control architecture 500 can be stored at one of multiple locations, in accordance with an aspect of the subject invention. For example, data can be accessed from the data access component 510, the object layer 530, the MES layer 540, etc. Although data can be accessed from more than one location within the control architecture 500, such data will only reside (e.g., stored) in one location in order to provide consistent updates of the properties and methods of such data. For example, data can be located and accessed from either the data object component 510 or the object layer 530. Additionally, it is to be appreciated that data employed in accordance with the subject invention can be in substantially any location relative to the control architecture 500.

A single interface can be employed to read and/or write to data properties and/or methods regardless of what level of the architecture 500 is attempting to access the data. For instance, if a particular level (e.g., ERP, MES, control, etc.) attempts to access particular data or consume such object service oriented data from a disparate location, the data will have the same representation regardless of the type and/or location of the data consumer, for example. In other words, the data will appear as an object with specific properties and/or methods. In addition, regardless of whether such data is activated locally or is utilized in a disparate location, the data consumer can still have the same kind of capabilities and interfaces to access that data.

Figure 6:
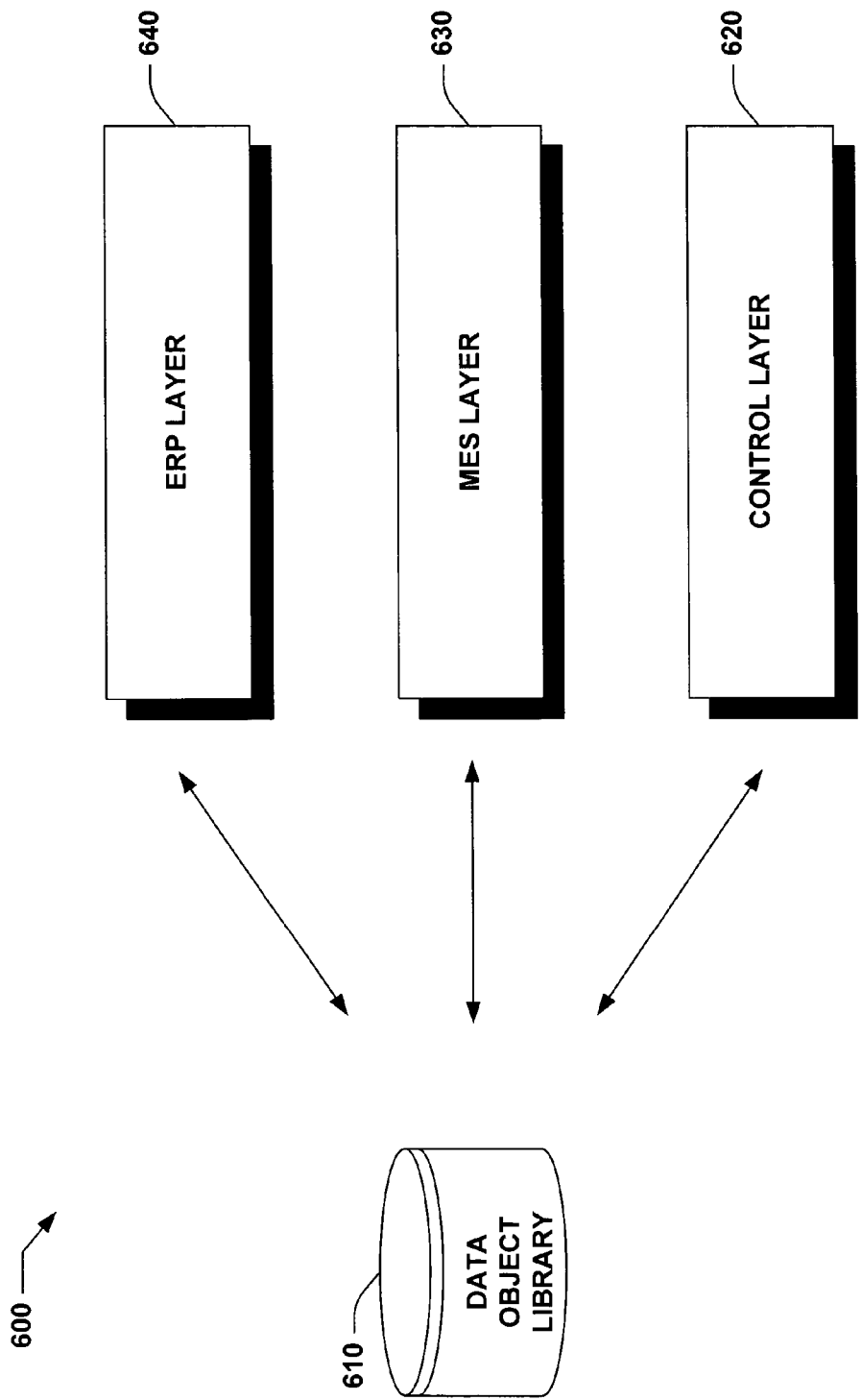
FIG. 6 illustrates a data directory system with an address list in accordance with an aspect of the current invention.

FIG. 6 shows a system 600 wherein a data object library 610 can interface to a control layer 620, an MES layer 630 and/or an ERP layer 640. In this approach, the data object library 610 can be populated by one or more data objects received from any number of sources. For example, the data object(s) can be received from the MES layer 630 and/or an outside data object source.

Conventionally, data employed within one layer of a control architecture cannot be readily employed (e.g., read, written, etc.) with a disparate layer of the same architecture. Instead, such data has to be reformatted and/or reconfigured to meet certain data consumption requirements of each layer utilizing the data. However, in accordance with an aspect of the subject invention, data can be encapsulated and stored in the data object library 610 in order to expose desired properties and methods of the data to various consumers. In this manner, the data object library can be distributed such that one or more data objects can be employed with a particular project by simply dragging and dropping desired data objects into a particular project. For example, a user can build a data object library utilizing one or more data objects to perform a desired control function and also interface to the MES level and/or external integration. Such data objects can be stored in the data object library 610 and utilized at some time in the future by simply "grabbing" the library object and dropping it into a particular project.

The data object library 610 can be employed to organize data objects as desired by a particular user. For example, data objects can be segregated into various groups as needed with regard to various data consumers that access one or more data objects via the data object library 610. Thus, if a particular group of process points from various hardware and/or software components are employed to control the fabrication on a particular assembly line in a factory, such data can be first encapsulated as one or more data objects, in accordance with the subject invention. Then, these data objects can be placed as a group (e.g., sub-library) into the data object library 610 and employed by the entire data architecture including the control layer 620, MES layer 630 and ERP layer 640 seamlessly.

Figure 7:
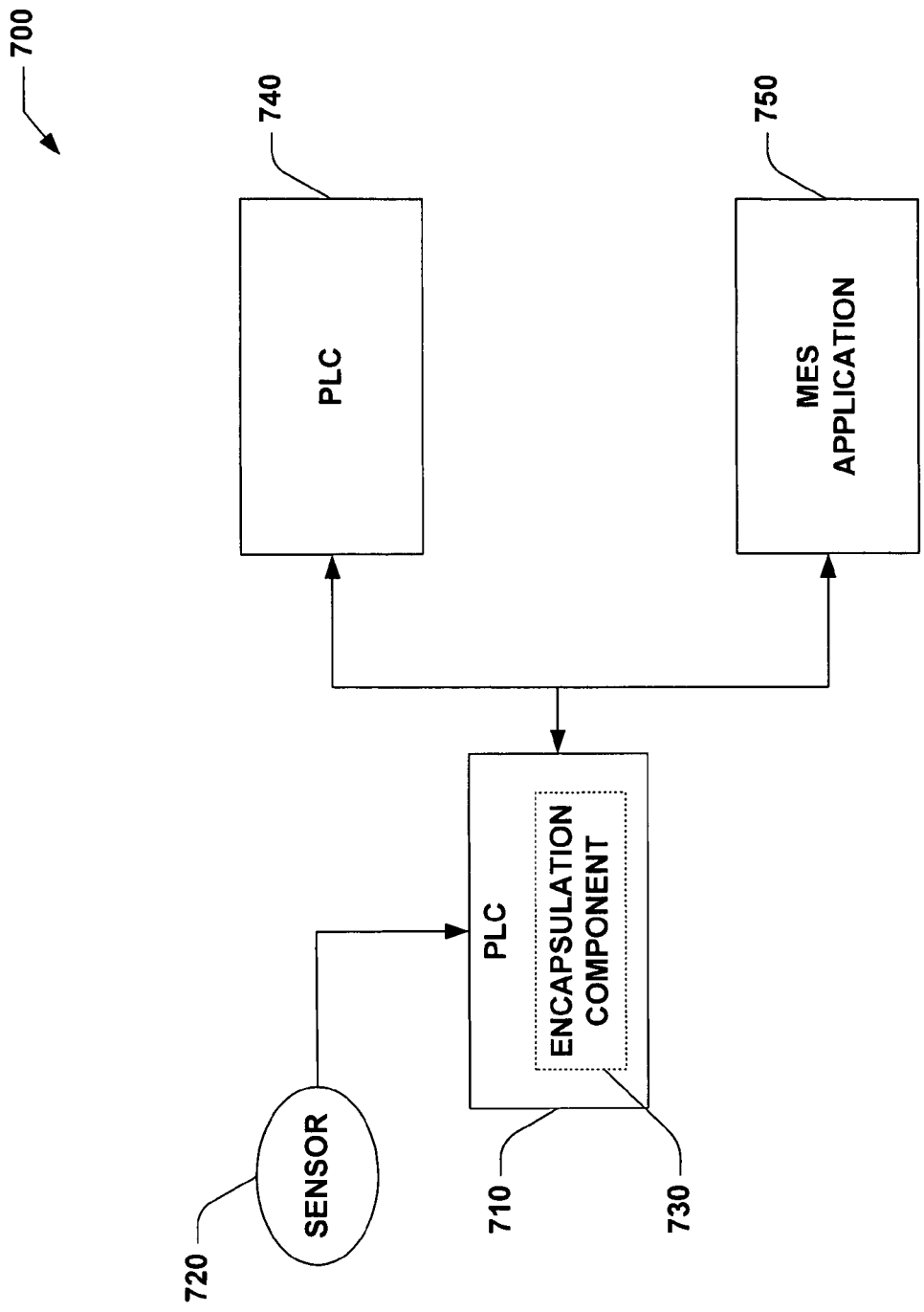
FIG. 7 illustrates an exemplary control architecture in a network environment in accordance with an aspect of the current invention.

FIG. 7 illustrates an exemplary system 700 that employs a programmable logic controller (PLC) 710 to interface with a sensor 720 and provide such information to a PLC 740 and/or an MES application 750. In order to facilitate communication of data properties and/or methods, the PLC 710 can be coupled to an encapsulation component 730 that accepts data from the sensor and converts the sensor data to a data object that can be employed with the PLC 710, the PLC 740 and/or the MES application 750 (e.g., data consumers). It is to be appreciated that the one or more data consumers can interface to the data object(s) from the encapsulation component in substantially the same manner. For example, the MES application 750 can request a particular type of data object and be connected to the PLC 710 to interface with such a data object named "Tank 1." Once such a result was returned, the MES application could employ structured methods to call on that data object that would actually send services to the PLC 710. In this manner, programs such as C#, Visual Basic, C and the like could be utilized within the MES application 750 to support such a service level architecture and easily access the data object "Tank 1."

Figure 8:
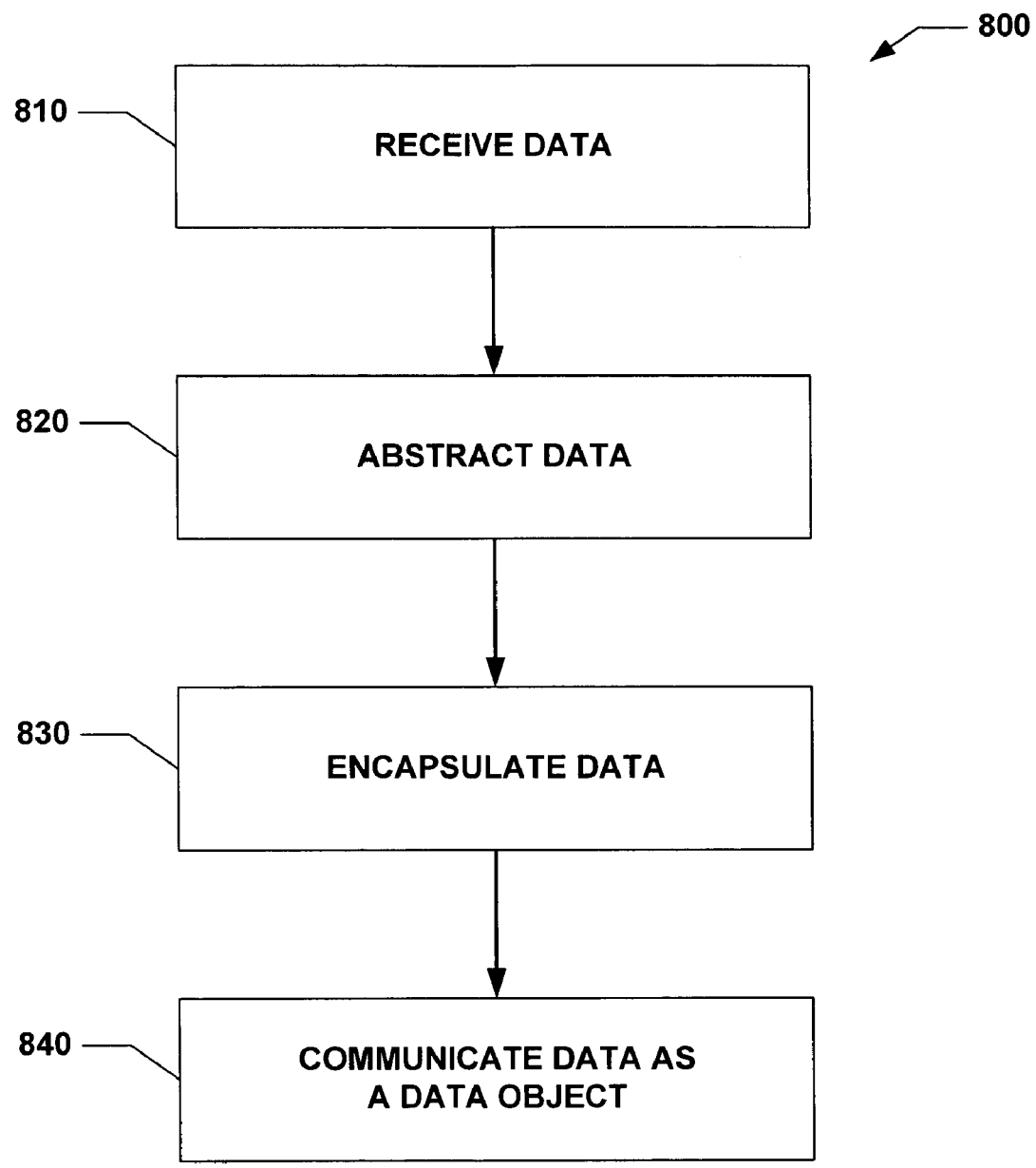
FIG. 8 illustrates an exemplary methodology that receives data from an address in accordance with an aspect of the subject invention.
Figure 9:
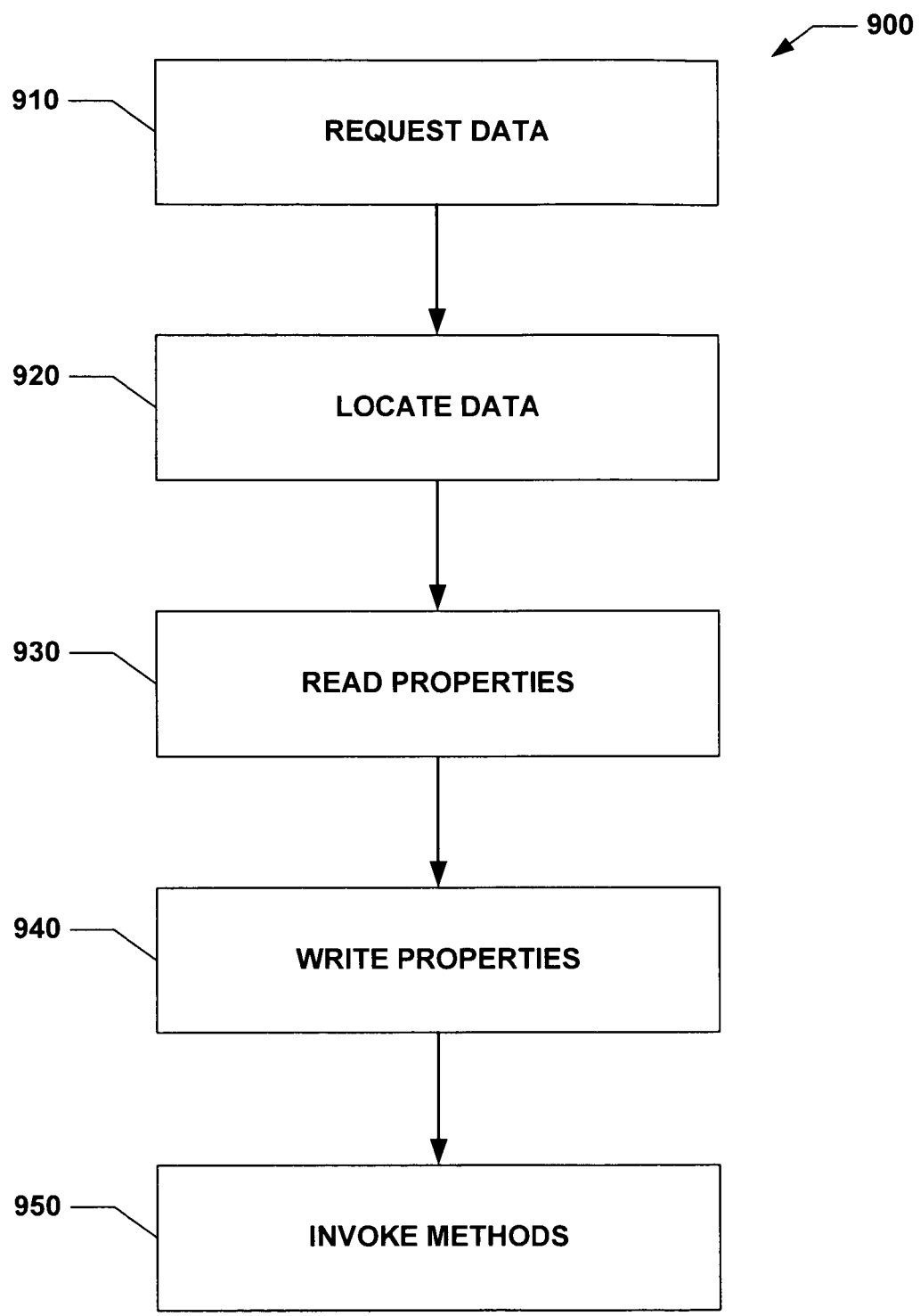
FIG. 9 illustrates an exemplary methodology that selects data based on associated attributes in accordance with an aspect of the subject invention.
Figure 10:
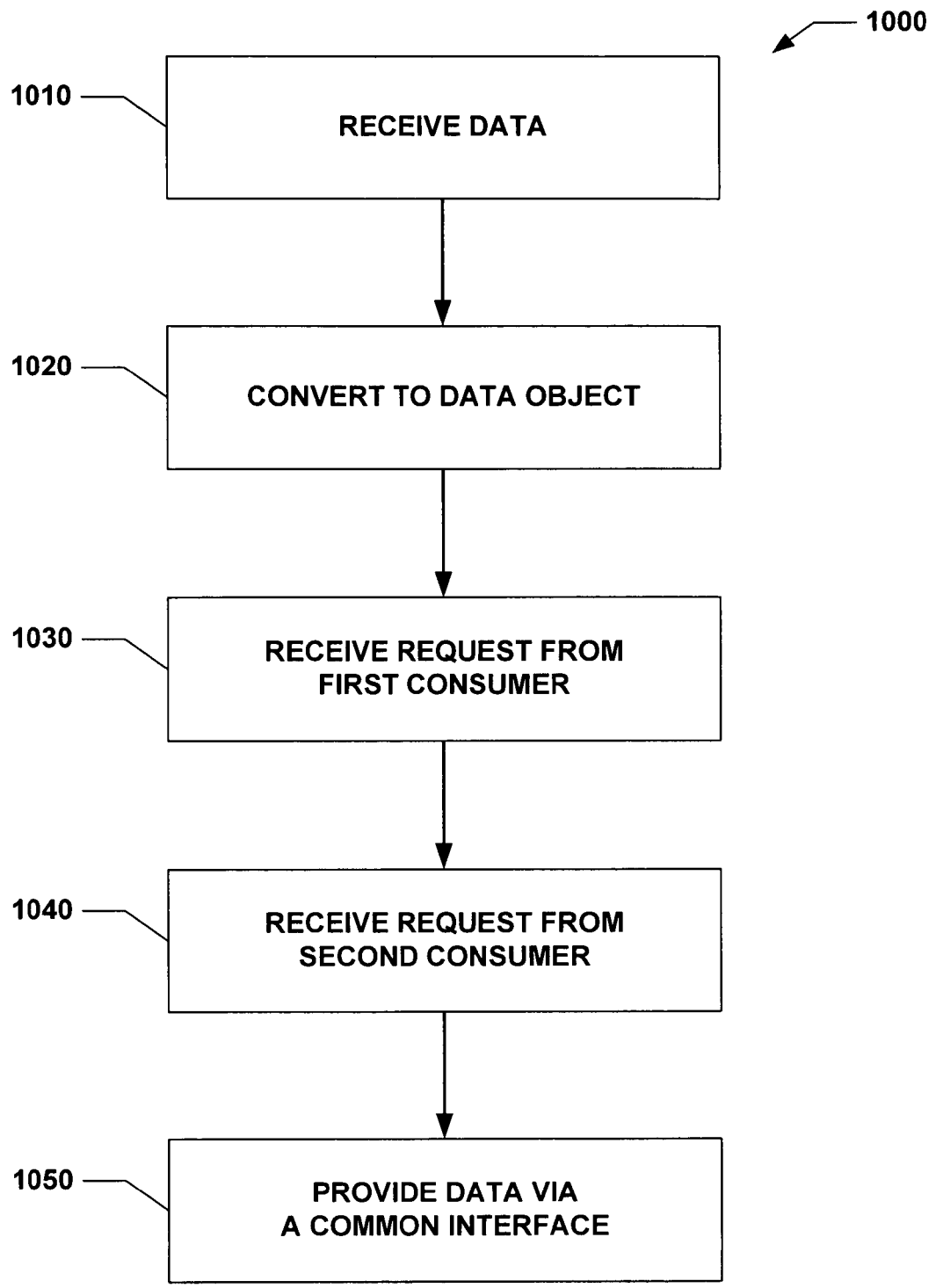
FIG. 10 illustrates an exemplary methodology that implements data with a requesting application.

FIGS. 8, 9 and 10 illustrate methodologies 800, 900 and 1000 in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

Referring now to FIG. 8, illustrated is a methodology 800 employed to expose data properties and methods to one or more consumers. In this manner, object oriented access to information can be provided to one or more levels within a particular control architecture. At 810 data is received from substantially any source that can communicate information. Such information can be communicated via one or more protocols (e.g., serial, ControlNet, DeviceNet, etc.) utilizing various wired and/or wireless media such as coaxial cable, Ethernet cable, infrared, wireless Ethernet and the like. Information can be received based on an event, periodically or one time, for instance. By way of example, data can be received whenever a particular temperature meets or exceeds a predetermined value.

The data received can be communicated in varying lengths utilizing various formats and/or standards. Generally, such data can include values and methods associated with the data received. Metadata can be employed to describe such values and methods received to help clients understand what methods and properties are available and how to access and/or invoke such properties and methods. In addition, such data can be received in substantially any location that is associated with a control architecture. In this approach, the data can be received as a layer next to or part of an MES system or as a white box cooperating to encapsulate data in the controller and/or the MES layer, for example. Alternatively, the data can be received via controller to support object-oriented access to information as a standard behavior of controller data types and tags of those data types.

At 820, the data is abstracted such that the data can be associated with information that may be of some use to one or more data consumers. For example, the data can provide values, device manufacturer, device protocols, device ports, device location, device IP address, device color, periodicity of the data, etc. However, one or more consumers may not request all communicated data. Such abstraction can help determine the manner of encapsulation of the data.

At 830, the data is encapsulated such that the data can be provided to one or more data consumers. In this manner, only an appropriate subset of properties and methods can be exposed to a particular consumer to prevent a consumer from accessing data which they are not authorized to access and/or are not interested in accessing. By limiting the exposure of the properties and methods of the data, changes to the manner in which properties and methods are accessed will not affect disparate consumers that are accessing such data. In addition, encapsulation of the data can provide selective access to properties and/or methods that can employ a particular interface throughout a control architecture, for example. At 840, the data is communicated as a data object to one or more data consumers.

FIG. 9 shows an exemplary methodology 900 wherein properties and methods of data are employed. At 910, data is requested. Such data can be requested by one or more data consumers associated with a control system, for example. In addition, the type, attributes, format, etc. of the data can be specified and such a request can be accomplished via a search engine, query component and the like. At 920, data is located. Data can be located within a particular system based at least in part on requested data parameters. In this manner, the data location, address or any specific information relating data meaning would be unnecessary to locate requested data. Thus, a system can accommodate substantially any data requests, especially those from consumers that are new and/or unfamiliar with the architecture of a particular control system.

At 930, the data consumer reads data properties and at 940 the data consumer can write to one or more data properties. Similarly, the data consumer can invoke methods associated with the data at 950 located at 920. Thus, upon locating desired data, a consumer can begin to employ such located data with one or more processes associated with the data consumer. Providing data that is encapsulated such that it supports object-oriented access to the information can facilitate such interaction. Additionally, the consumer can employ various object oriented concepts with the data such as properties, methods, scope qualifiers, access qualifiers, polymorphism and the like.

Turning now to FIG. 10, illustrated is a methodology 1000 to provide data via a common interface to both a first and second data consumer. At 1010, data is received in accordance with various protocols, media, and standards. Such data can be polled and/or accepted whenever such data arrives at a particular component and/or device for example. At 1020, the data received is converted to a data object, in accordance with an aspect of the invention. The data can be converted to a data object by abstracting and encapsulating the data to provide a means for data consumers to employ such data. At 1030, a request is received from a first consumer. Such consumer can make the request locally and/or remotely to the data and can be located in substantially any location associated with a control system such as the MES layer, control layer and the like. At 1040, a request is received from a second consumer. Such consumer can similarly be located in substantially any location. At 1050, data is provided to both the first and second consumer utilizing a common interface to utilize the data object with each respective consumer. Such an interface can be defined based on a plurality of factors such as the need of the consumer, the properties and/or methods associated with the data and so on.

Figure 11:
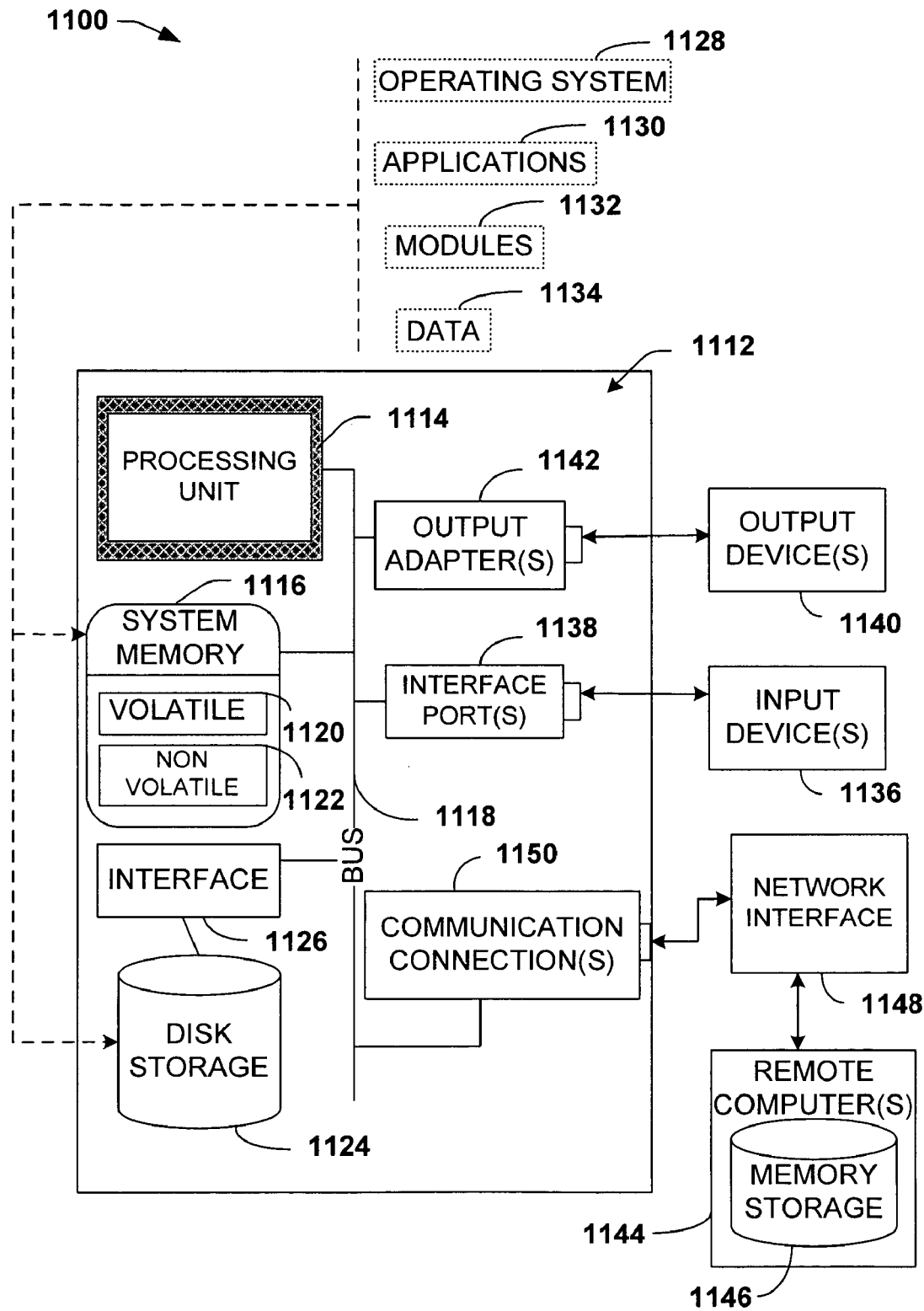
FIG. 11 illustrates an exemplary computing environment wherein the invention can be employed.

With reference to FIG. 11, an exemplary environment 1100 for implementing various aspects of the invention includes a computer 1112 is depicted. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
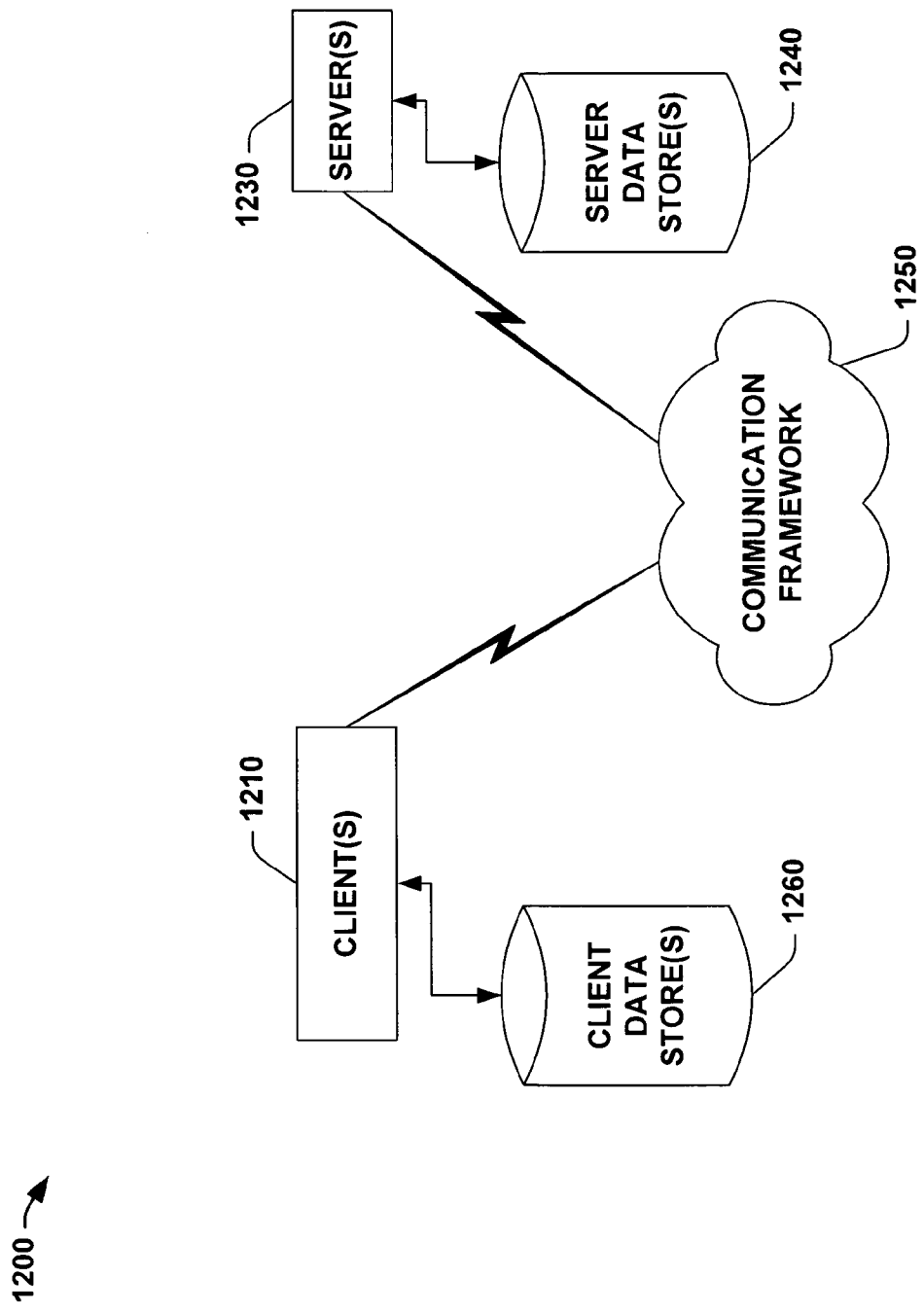
FIG. 12 illustrates an exemplary network wherein the invention can be employed.
Figure 13:
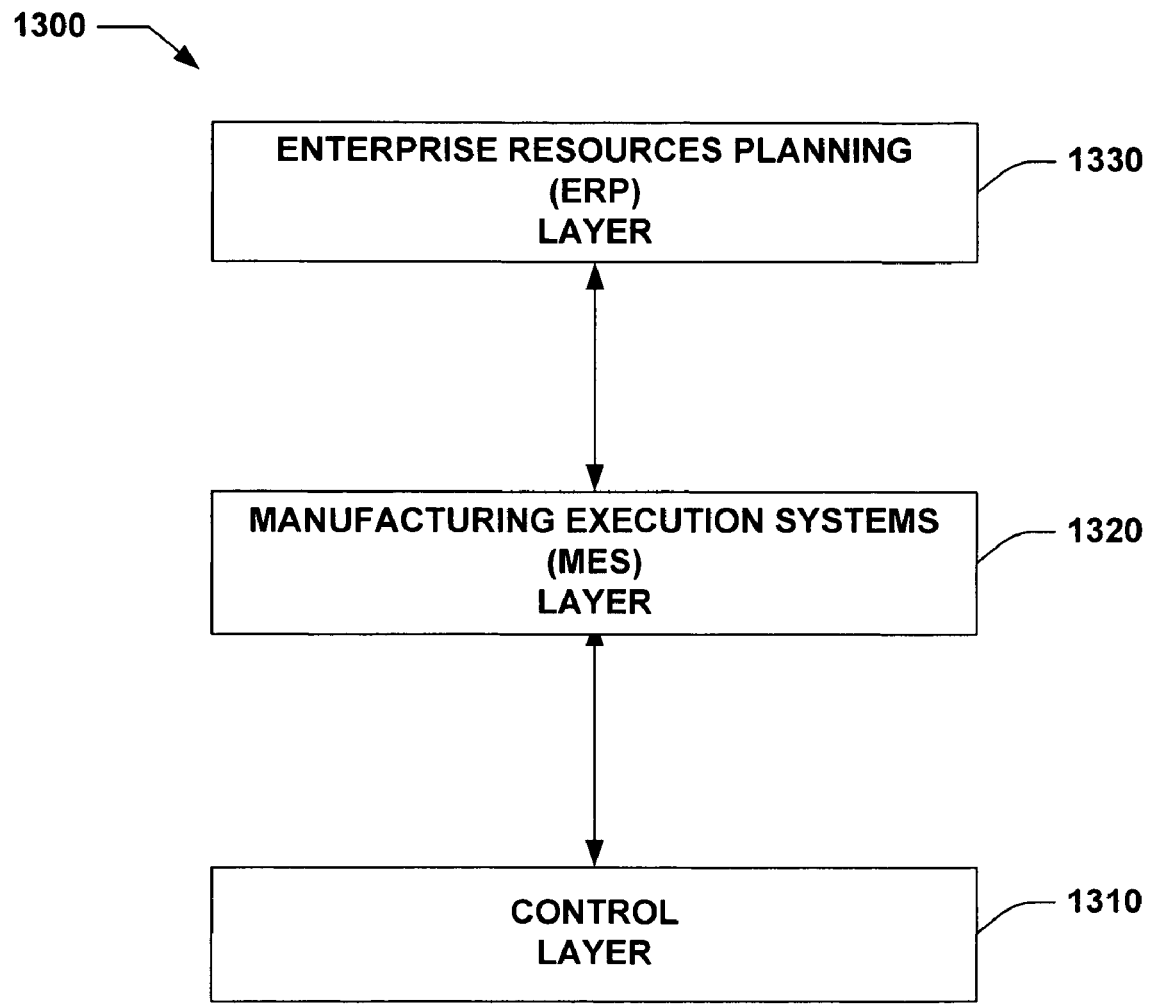
FIG. 13 is an exemplary conventional architecture commonly employed in industrial automation environments.

FIG. 12 illustrates an exemplary computing environment 1200 in which the subject invention can be employed. The system 1200 includes one or more client(s) 1210. The client(s) 1210 can be hardware and/or software (e.g., threads, processes, computing devices). The system 1200 additionally includes one or more server(s) 1230. Likewise, the server(s) 1230 can be hardware and/or software (e.g., threads, processes, computing devices).

One possible communication between a client 1210 and a server 1230 can be in the form of a data packet transmitted between two or more computer processes. The system 1200 further includes a communication framework 1250 that can be employed to facilitate communications between the client(s) 1210 and the server(s) 1230. The client(s) 1210 can interface with one or more client data store(s) 1260, which can be employed to store information local to the client(s) 1210. Similarly, the server(s) 1200 can interface with one or more server data store(s) 1240, which can be employed to store information local to the servers 1230.

What has been described above includes examples of the subject invention. It is, of course, not possible to describe every conceivable combination of components or methodologies for purposes of describing the subject invention, but one of ordinary skill in the art can recognize that many further combinations and permutations of the subject invention are possible. Accordingly, the subject invention is intended to embrace all such alterations, modifications and variations that fall within the spirit and scope of the appended claims. In this regard, it will also be recognized that the invention includes a system as well as a computer-readable medium having computer-executable instructions for performing the steps of the various methods of the invention. In addition, while a particular feature of the invention may have been disclosed with respect to only one of several aspects or implementations of the invention, such a feature can be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A system that provides data to an industrial control system, comprising a computer processor for executing the following software components, the system is recorded on a computer-readable medium and capable of execution by a computer, comprising:

a packaging component associated with an industrial control device that receives data from a source and encapsulates the data to package properties and methods relating to the data as one or more data objects, wherein the packaging component supports object oriented access to the data with at least one level of a particular control architecture;

a data consuming device located in an industrial control network that employs an interface to access a selected data object from one of the encapsulated data objects and then directly reads, or writes properties and invokes methods of controller-based data objects; and an abstraction component that receives data from at least one source that is located within a particular control architecture and determines the properties and methods that are exposed to a particular data consuming device, wherein the data employs various formatting and includes self-describing information that relates to how such data can be employed, source of the data and scale of the data.

2. The system of claim 1, the packaging component is associated with one or more of a processing device, a smart terminal, a remote terminal, an industrial processor, a programmable logic controller and an intelligent controller.

3. The system of claim 1, the data consuming device is located in at least one of an enterprise resources planning layer, a manufacturing execution systems layer, an object layer and a control layer.

4. The system of claim 1, the data consuming device is one or more of a processing device, a smart terminal, a remote terminal, an industrial processor, a programmable logic controller and an intelligent controller.

5. The system of claim 1, the interface prevents an unauthorized data consuming device from accessing at least one of the data properties and the data methods.

6. The system of claim 1, further comprising a search engine that can locate at least one of the data property and the data method via utilizing the encapsulated data.

7. The system of claim 1, the data consuming device can at least one of directly read data properties, directly write properties and directly invoke data methods.

8. The system of claim 1, only a single instance of each data object is associated with the industrial control system.

9. The system of claim 1, the packaging component can be located in one of an enterprise resources planning layer, a manufacturing execution systems layer, an object layer and a control layer.

10. The system of claim 1, the data consuming device can request data from the packaging component based on one of a condition, a time and on a periodic basis.

11. The system of claim 1, encapsulation prevents the data consuming device from viewing modifications made to at least one of properties and methods of the data object.

12. The system of claim 1, further comprising an artificial intelligence (AI) component that determines the appropriate interface between the data consuming device and the data object.

13. The system of claim 12, the AI component determines the appropriate interface based on at least one of model of the data consuming device, requirements of the data consuming device, revision of the consuming device, history of data access of the consuming device and authorization level of the consuming device.

14. The system of claim 12, the AI component makes the determination based at least in part on one of a support vector machine, a neural network, a back-propagation network, a feed forward back propagation network, radial basis network, fuzzy logic network, an expert system, a Bayesian network, and a data fusion network.

15. The system of claim 1, the packaging component is associated with at least one of a processing device, a smart terminal, a remote terminal, an industrial processor, a programmable logic controller and an intelligent controller.

16. The system of claim 1, the packaging component employs at least one of .NET common language runtime, Java virtual machine, relay ladder logic, structured text, function block diagram, sequential function chart and instruction list.

17. A computer implemented method to provide data within an industrial control system, comprising:
receiving data from a source;
determining the properties and methods that are exposed to a particular data consuming device;
abstracting a property and a method of the data, wherein the data employs various formatting and includes self describing information that relates to how such data can be employed, source of the data and scale of the data;
encapsulating the property and method of the data to provide a data object;
exposing the property and method of the data to at least one data subscriber; and
directly reading, or writing properties and invoking methods of data objects.

18. The method of claim 17, further comprising interfacing with the data subscriber to determine one of the data subscriber needs and the authorization of the data subscriber.

19. The method of claim 18, interfacing with the property and method includes at least one of reading one or more properties, writing one or more properties and invoking one or more methods.

20. The method of claim 17, further comprising accessing the data object via the data subscriber.

21. The method of claim 17, data is received at one an LRP layer, an MES layer, a control layer and an object layer.

22. The method of claim 17, further comprising interchanging the data object between one or more layers, wherein the layers are one of an LRP layer, an MES layer, a control layer and an object layer.

23. The method of claim 17, further comprising storing one or more data objects in an object library.

24. The method of claim 17, further comprising searching for one or more data objects based at least in part upon a property and/or a method.

25. A method to provide object oriented access to information, comprising:
means for accepting data from an industrial control component;
means for determining the properties and methods that are exposed to a particular data consuming device;
means for abstracting a property and a method of the data, wherein the data employs various formatting and includes self-describing information that relates to how such data can be employed, source of the data and scale of the data;
means for encapsulating the data by exposing an appropriate subset of properties and methods; and
means for providing such properties and methods to a data consumer.

* * * * *

UNITED STATES PATENT AND TRADEMARK OFFICE
CERTIFICATE OF CORRECTION

PATENT NO. : 7,693,585 B2
APPLICATION NO. : 10/955654
DATED : April 6, 2010
INVENTOR(S) : Michael D. Kalan et al.

It is certified that error appears in the above-identified patent and that said Letters Patent is hereby corrected as shown below:

IN THE CLAIMS:

In Column 18, Line 14, Claim 21, delete "LRP" and replace with "ERP".

In Column 18, Line 18, Claim 22, delete "LRP" and replace with "ERP".

Signed and Sealed this

Eighteenth Day of May, 2010

David J. Kappos
*Director of the United States Patent and Trademark Office*